United States Patent
Jacobs et al.

(10) Patent No.: US 9,241,140 B2
(45) Date of Patent: Jan. 19, 2016

(54) ARRANGEMENT FOR VIDEO SURVEILLANCE

(75) Inventors: Marco Jacobs, Endhoven (NL); Johan Groenenboom, Geldrop (NL)

(73) Assignee: Robert Bosch GmbH, Stuttgart (DE)

( * ) Notice: Subject to any disclaimer, the term of this patent is extended or adjusted under 35 U.S.C. 154(b) by 1538 days.

(21) Appl. No.: 11/909,437

(22) PCT Filed: Dec. 22, 2005

(86) PCT No.: PCT/EP2005/057125
§ 371 (c)(1),
(2), (4) Date: Sep. 21, 2007

(87) PCT Pub. No.: WO2007/071291
PCT Pub. Date: Jun. 28, 2007

(65) Prior Publication Data
US 2010/0007735 A1 Jan. 14, 2010

(51) Int. Cl.
*H04N 7/18* (2006.01)
*H04N 5/228* (2006.01)
*H04N 5/76* (2006.01)
*H04N 21/218* (2011.01)
*H04N 21/4147* (2011.01)
*H04N 21/433* (2011.01)
*H04N 21/436* (2011.01)
*H04N 5/77* (2006.01)
*H04N 5/775* (2006.01)

(52) U.S. Cl.
CPC .............. *H04N 7/183* (2013.01); *H04N 5/76* (2013.01); *H04N 21/21805* (2013.01); *H04N 21/4147* (2013.01); *H04N 21/4334* (2013.01); *H04N 21/43622* (2013.01); *H04N 5/772* (2013.01); *H04N 5/775* (2013.01)

(58) Field of Classification Search
CPC .............. H04N 7/183; H04N 21/4334; H04N 21/43622
USPC ........................ 348/154, 155, 208.4
See application file for complete search history.

(56) References Cited

U.S. PATENT DOCUMENTS

| 3,869,713 | A | * | 3/1975 | Owens, Jr. .................... 386/201 |
| 4,945,417 | A | | 7/1990 | Elberbaum |
| 5,053,876 | A | * | 10/1991 | Blissett et al. ............ 348/208.14 |
| 5,448,053 | A | * | 9/1995 | Rhoads ....................... 250/201.9 |
| 5,627,616 | A | | 5/1997 | Sergeant et al. |
| 2004/0141633 | A1 | | 7/2004 | Horie |
| 2007/0121094 | A1 | * | 5/2007 | Gallagher et al. ........... 356/4.03 |

FOREIGN PATENT DOCUMENTS

| EP | 1 596 601 | | 11/2005 | |
| WO | 91/02287 | | 2/1991 | |
| WO | WO9519093 | * | 7/1995 | ............. H04N 13/00 |
| WO | 95/35627 | | 12/1995 | |

* cited by examiner

*Primary Examiner* — June Sison
*Assistant Examiner* — Adam Cooney
(74) *Attorney, Agent, or Firm* — Michael J. Striker

(57) ABSTRACT

The invention relates to an arrangement for video surveillance with at least one video camera which can be directed into different positions by a remote controlled pan and/or tilt and/or zoom unit and with at least one video signal receiving device, which comprises means for demultiplexing the video Signals of the video camera in such a way that the at least one video signal receiving device receives video Signals generated by the video camera while remaining in one of the different positions only.

13 Claims, 3 Drawing Sheets

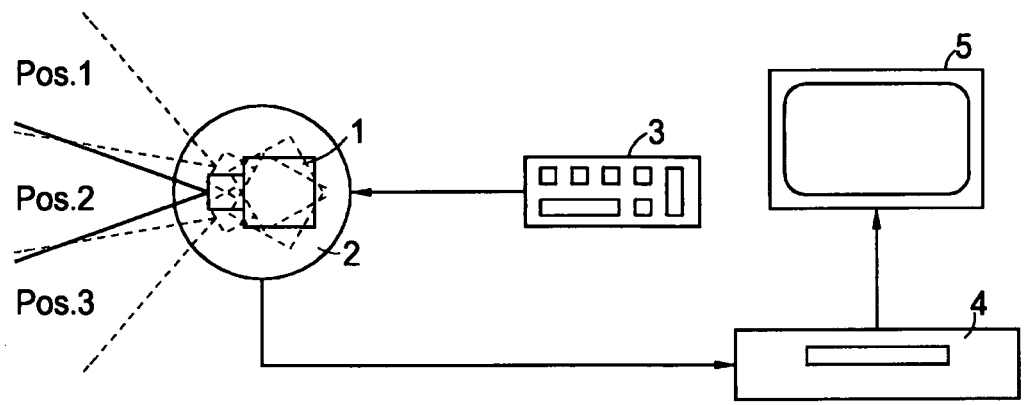
Fig.1
Fig.2
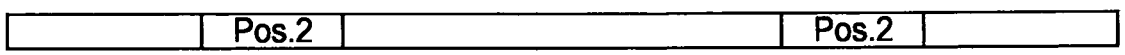
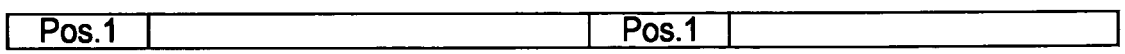
Fig.3

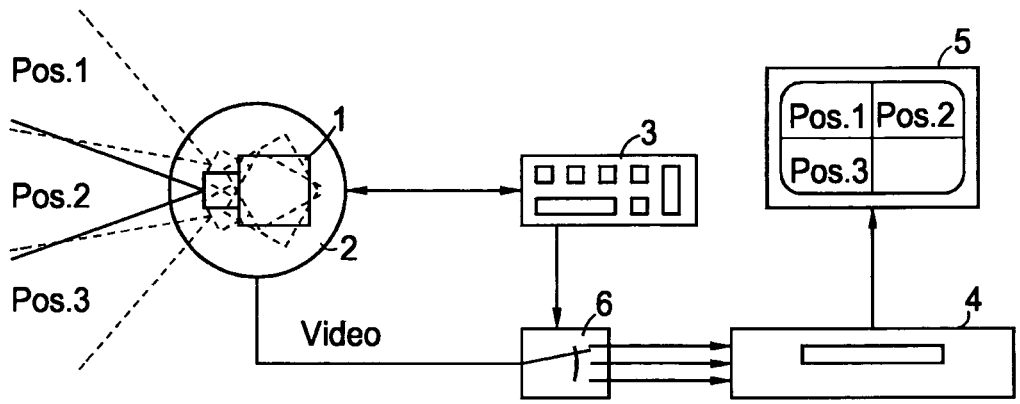

ARRANGEMENT FOR VIDEO SURVEILLANCE

FIELD OF THE INVENTION

The invention relates to an arrangement for video surveillance with at least one video camera which can be directed into different positions by a remote controlled pan and/or tilt and/or zoom unit and with at least one video signal receiving device.

BACKGROUND OF THE INVENTION

For surveillance purpose video cameras are often mounted on pan and/or tilt and/or zoom units, so called domes, in order to direct the video camera on the interesting scenes. Usually the user controls by means of a keyboard the direction at which the video camera is picking-up. However the domes can also be set-up to sequentially direct the video camera towards a number of predefined positions. At each position the video camera is waiting for a period of time before moving to the next position. In the following the word position is used for each setting including the direction of the video camera and the position of the zoom—in other words: the orientation and the size of the fields of view. After setting-up the dome and entering predefined positions the video camera moves from position to position automatically.

The video signal generated by the video camera is usually supplied to a digital video recording device and/or a picture monitor. The pictures which are seen either directly or in case of previously recorded video signals as playback include the pictures picked-up by the video camera in a sequence from position to position. Between the pictures from the positions blurred pictures are to be seen which are picked-up by the moving video camera. For instance such system is known from WO 95/35627.

One object of the invention is to improve the observation of scenes picked-up by the video camera and/or to improve automatically analysing the video signals.

SUMMARY OF THE INVENTION

The arrangement according to the invention comprises means for demultiplexing the video signals of the video camera in such a way that the at least one video signal receiving device receives video signals generated by the video camera while remaining in one of the different positions only.

The invention enables to observe the scenes or objects without being disturbed by the blurred pictures during motion of the video camera and pictures picked-up during the video camera rests in other positions.

The invention can be further developed, wherein a video signal recording device is arranged to record video signals related to all positions and to replay video signals related to at least one position separately. In case of using the video signal recording device the invention has a further advantage, namely to save recording space because video signals generated during the motion of the video camera are not recorded.

Preferably the video signal recording device comprises an addressable memory and an address controller for reading the video signals from the video camera into the memory and reading the video signals related to each of the positions separately. In an advantageous embodiment the addressable memory is a disc.

Further video compression methods can be applied effectively because the differences from frame to frame are smaller. For recognizing different positions of the video camera by means of image analyses land-marks, such as coloured stickers which can be easily recognized, can be placed in the scene. For instance stickers can have yellow and black stripes. For the transmission of the video signals and signalling between the control unit and the dome many methods known in the art are applicable.

Usually in video surveillance systems the video signals are recorded continuously and erased after a certain time in order to get a recording space for new video signals. This can be done very easily if the video signals related to each of the positions are recorded on different tracks.

The technical requirements may be different from position to position therefore a preferred embodiment of the invention comprises that settings referring to the at least one video camera and/or to recording and/or to displaying are stored separately for each of the positions.

The video signal receiving devices can be of different kinds depending on the targets to be reached by the inventive arrangement. Often the images are to be observed by a person. For this purpose the video receiving unit is a picture monitor and preferably video signals of different positions are displayed in a split-screen mode.

To avoid confusions about which image recorded or displayed belongs to which position a further embodiment comprises that different names are dedicated to the positions. These names may be superimposed on the pictures displayed.

The inventive arrangement can also be further developed wherein the at least one video signal receiving device is an image analysing system. In this case the invention has the advantage that the image analysing system gets only video signals related to one position so that consecutive images can be analysed without being disturbed by the images, from other positions or blurred images during movement of the video camera.

Such an embodiment can be improved in that way that parameters for image analysing can be set for each position separately, whereby preferably one parameter is a motion to be detected.

BRIEF DESCRIPTION OF THE DRAWINGS

These and other aspects of the invention will be apparent from the embodiments described herein after.

FIG. 1 shows a video surveillance system according to the state of the art;

FIG. 2 a time diagram showing the sequence of video signals generated by the video camera;

FIG. 3 time diagrams of video signals after demultiplexing;

FIG. 4 a first embodiment of the inventive arrangement;

FIG. 5 time diagrams of recording and reading of video signals in the embodiment according to FIG. 4;

FIG. 6 and alternative sequence of video signals; and

DESCRIPTION OF PREFERRED EMBODIMENTS

Figure 7:
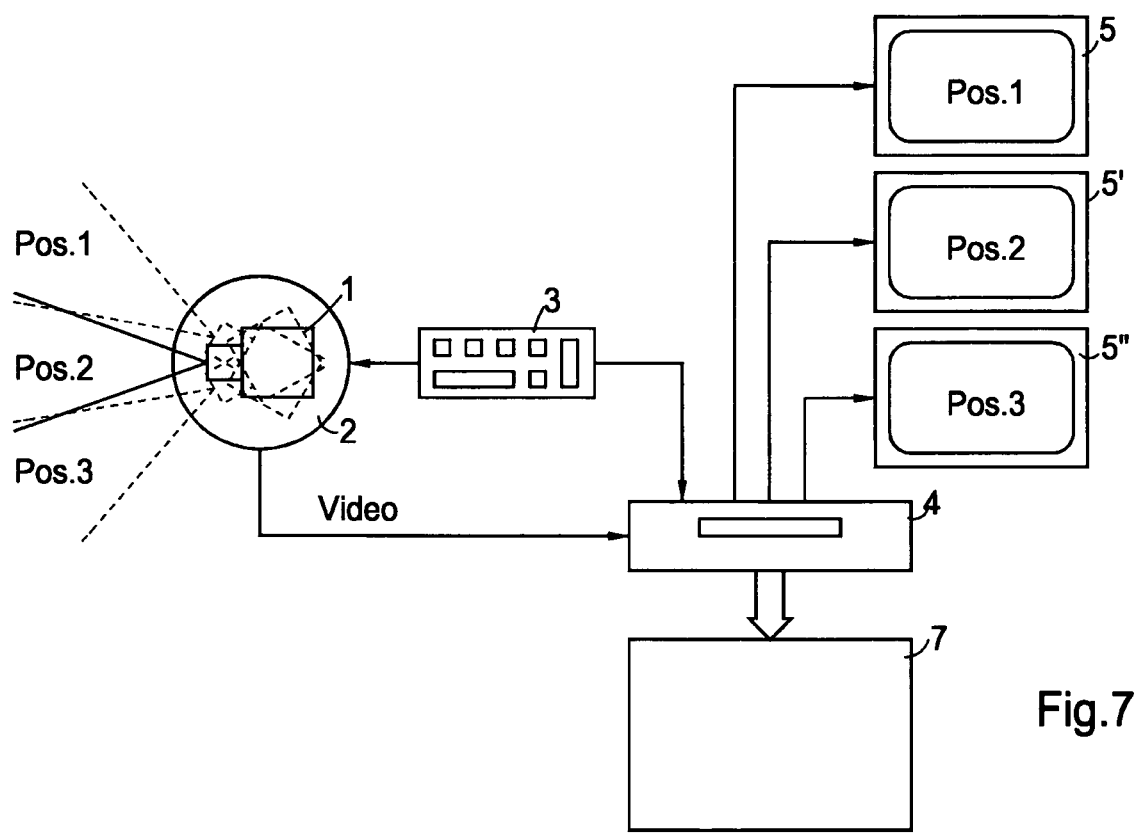
FIG. 7 a second embodiment of the invention.

The arrangement of FIG. 1 comprises a video camera 1, a pan, tilt and zoom unit 2—both called herein after dome—, a control unit 3 with a keyboard controlling the movement and positioning of the video camera, a digital video recorder 4, and a picture monitor 5. Usually the direction and the size of the field of view can be changed continuously by hand. Additionally some positions can be selected and stored so that they can recalled by the control unit 3 automatically in a pre-programmed sequence.

The resulting video signals are depicted in FIG. 2. The video signals generated by the video camera 1 while it is in the position 1 are labelled with Pos. 1 in FIG. 2 and so on. Video signals during a movement from one position to an other are marked by an arrow.

Although the invention can be carried-out with analogue video signals the use of digital video signals is preferred because digital video signals can better be recorded and processed.

FIG. 3 demonstrates demultiplexing the video signals into three video streams obtaining the pictures of position 1, 2, and 3. Video signals related to the movement of the video cameras marked by arrows are discarded.

FIG. 4 shows an embodiment of the inventive arrangement. In the path for the video signals between the video camera 1 and the digital video recorder 4 a demultiplexer 6 is inserted with three outputs according to the video signals Video 1, Video 2, and Video 3 which are recorded on different tracks of the recording medium. The demultiplexer 6 is controlled by the video camera control unit 3 depending on the position of the video camera. The monitor 5 is operated in a so-called split-screen mode showing different pictures at the same time on the screen.

The connections between the demultiplexer 6 and the digital video recorder 4 can be realized by a digital network where appropriate. The digital video signals can be transmitted in compressed form. Each arrow represents a separate digital video stream representing the output of a "virtual camera".

FIG. 5 shows the video signals as generated by the video camera, the video signals Video 1, Video 2, and Video 3 during recording on the respective track, and the video signals during reading from the respective track.

Together with the recording/reading process the video signals are subject to a time transformation. Without this time transformation there would occur black images through the images of one position.

FIG. 6 shows a different kind of recording the video signals namely as one video stream having sections of position 1, position 2, and position 3. The demultiplexing can be made by adequate controlling of the reading process.

FIG. 7 shows a second embodiment of the invention whereby the demultiplexer is integrated in the digital video recorder 4. For each of the positions a picture monitor 5, 5', 5" is provided. The data from the digital video recorder 4 are supplied to an image analysing system 7.

The invention claimed is:

1. A system for video surveillance with at least one video camera (1) which can be directed into different positions by a remote controlled pan and/or tilt and/or zoom unit (2) and with at least one video signal receiving device (5, 5', 5", 7) comprising means (4, 6) for demultiplexing a sequence of video signals of the video camera (1) including streams of video signals taken during movement from one position to another position, said demultiplexing implemented in such a way that the at least one video signal receiving device (5, 5', 5", 7) receives video signals generated by the video camera (1) while the video camera (1) remains in one of the different positions only, and discarding the streams of video signals related to the movement of the video camera (1) wherein the video signal receiving device (5', 5", 7) only receives streams of video signals related to one of the different positions without being disturbed by video signals from other positions or blurred images in video signals generated by the video camera (1) during movement from one of the different positions to another.

2. A system according to claim 1, wherein a video signal recording device (4) is arranged to record video signals related to all positions and to replay video signals related to at least one position separately.

3. A system according to claim 2, wherein the video signal recording device (4) comprises an addressable memory and an address controller for reading the video signals from the video camera (1) into the memory and reading the video signals related to each of the positions separately.

4. A system according to claim 3, wherein the addressable memory is a disc.

5. A system according to claim 4, wherein the video signals related to each of the positions are recorded on different tracks.

6. A system according to claim 2, wherein settings referring to the at least one video camera (1) and/or to recording and/or to displaying are stored separately for each of the positions.

7. A system according to claim 1, wherein the video receiving unit is a picture monitor (5, 5', 5").

8. A system according to claim 7, wherein video signals of different positions are displayed in a split-screen mode.

9. A system according to claim 1, wherein different names are dedicated to the positions.

10. A system according to claim 1, wherein the at least one video signal receiving device is an image analyzing system (7).

11. A system according to claim 10, wherein parameters for image analyzing (7) can be set for each position separately.

12. A system according to claim 11, wherein one parameter is a motion to be detected.

13. A system for video surveillance with at least one video camera (1) which can be directed into different positions by a remote controlled pan and/or tilt and/or zoom unit (2) and with at least one video signal receiving device (5, 5', 5", 7) comprising means (4, 6) for demultiplexing a sequence of video signals of the video camera (1) including streams of video signals taken during movement from one position to another position, wherein said means for multiplexing controlled by a control unit in accordance with a position of the at least one video camera (1) in order that said demultiplexing is implemented in such a way that the at least one video signal receiving device (5, 5', 5", 7) receives video signals generated by the video camera (1) while the video camera (1) remains in one of the different positions only, discarding the streams of video signals related to the movement of the video camera (1) and wherein the video signals related to each of the different positions are recorded on different tracks.

* * * * *